United States Patent
Zhang et al.

(10) Patent No.: US 12,492,165 B2
(45) Date of Patent: Dec. 9, 2025

(54) METHOD FOR PURIFYING KEY INTERMEDIATES OF CITALOPRAM

(71) Applicants: ZHEJIANG HUAHAI PHARMACEUTICAL CO., LTD., Linhai Taizhou (CN); Zhejiang Huahai LiCheng Pharmaceutical Co., Ltd., Linhai Taizhou (CN)

(72) Inventors: Jian Zhang, Linhai Taizhou (CN); Jichao Wang, Linhai Taizhou (CN); Xiangqian You, Linhai Taizhou (CN); Liangwei Qian, Linhai Taizhou (CN); Tao Zhou, Linhai Taizhou (CN); Jiaxing Hu, Linhai Taizhou (CN); Wenfeng Huang, Linhai Taizhou (CN)

(73) Assignees: ZHEJIANG HUAHAI PHARMACEUTICAL CO., LTD., Zhejiang (CN); ZHEJIANG HUAHAI LICHENG PHARMACEUTICAL CO., LTD., Zhejiang (CN)

(*) Notice: Subject to any disclaimer, the term of this patent is extended or adjusted under 35 U.S.C. 154(b) by 404 days.

(21) Appl. No.: 18/261,363

(22) PCT Filed: Dec. 28, 2021

(86) PCT No.: PCT/CN2021/141912
§ 371 (c)(1),
(2) Date: Jul. 13, 2023

(87) PCT Pub. No.: WO2022/151968
PCT Pub. Date: Jul. 21, 2022

(65) Prior Publication Data
US 2024/0092729 A1    Mar. 21, 2024

(30) Foreign Application Priority Data
Jan. 14, 2021   (CN) .......................... 202110047338.2

(51) Int. Cl.
*C07C 255/59*   (2006.01)
*C07C 253/34*   (2006.01)

(52) U.S. Cl.
CPC .......... *C07C 255/59* (2013.01); *C07C 253/34* (2013.01)

(58) Field of Classification Search
None
See application file for complete search history.

(56) References Cited

U.S. PATENT DOCUMENTS

2009/0099375 A1   4/2009   Kaushik et al.
2011/0092719 A1   4/2011   Giridhar et al.

FOREIGN PATENT DOCUMENTS

| CN | 1688565 | 10/2005 |
|---|---|---|
| CN | 1729164 | 2/2006 |
| CN | 101177407 | 5/2008 |
| CN | 101203614 | 6/2008 |
| CN | 101265215 | 9/2008 |
| CN | 101538257 | 9/2009 |
| CN | 102190600 | 9/2011 |
| CN | 102675152 | 9/2012 |
| CN | 103360353 | 10/2013 |
| CN | 105294496 | 2/2016 |
| CN | 106892837 | 6/2017 |
| CN | 107848958 | 3/2018 |
| CN | 109988083 | 7/2019 |
| CN | 110590602 | 12/2019 |
| CN | 111302971 | 6/2020 |
| CN | 111533662 | 8/2020 |
| CN | 116568667 | 8/2023 |
| WO | WO 2005092875 | 10/2005 |
| WO | WO 2006/136521 | 12/2006 |
| WO | WO 2016197320 | 12/2016 |

OTHER PUBLICATIONS

International Search Report and Written Opinion issued in counterpart PCT Application No. PCT/CN2021/141912, dated Mar. 23, 2022.
"Synthesis of a related substance of escitalpram", *Chinese Journal of Medicinal Chemistry*, vol. 25, No. 5, pp. 389-392, 2015 (English Abstract provided).
Office Action issued in corresponding Chinese Application No. 202180081375.3, dated May 28, 2025 (English Translation provided).
Office Action issued in corresponding Chinese Application No. 202110047338.2, dated Jul. 9, 2025 (English Translation provided).
Zong et al. "Added-Metal-Free Catalytic Nucleophilic Addition of Grignard Reagents to Ketones." *J. Org. Chem.*, vol. 77, No. 10, 2012, pp. 4645-4652.
Extended European Search Report issued in corresponding European Application No. 21919155.8, dated Jun. 25, 2024.

*Primary Examiner* — Samantha L Shterengarts
(74) *Attorney, Agent, or Firm* — NORTON ROSE FULBRIGHT US LLP

(57) ABSTRACT

The present invention relates to a method for purifying key intermediates of Citalopram, i.e. 4-[4-(dimethylamino)-1-(4-fluorophenyl)-1-hydroxybutyl]-3-hydroxymethylbenzonitrile and a salt thereof. The method comprises dissolving crude 4-[4-(dimethylamino)-1-(4-fluorophenyl)-1-hydroxybutyl]-3-hydroxymethylbenzonitrile (compound of formula I containing formaldehyde impurity) with an organic solvent, adding a washing solution, controlling the temperature, stirring, leaving to stand for layering, and removing the aqueous layer, so as to obtain a purified organic solution of 4-[4-(dimethylamino)-1-(4-fluorophenyl)-1-hydroxybutyl]-3-hydroxymethylbenzonitrile. The method provided by the present invention can effectively remove aldehyde group-containing impurities in the intermediate. The method of the present invention has the advantages of simple operation, cheap raw materials and mild conditions, and is suitable for large-scale industrial production.

19 Claims, No Drawings

METHOD FOR PURIFYING KEY INTERMEDIATES OF CITALOPRAM

CROSS-REFERENCE TO RELATED APPLICATIONS

The present application is a national phase application under 35 U.S.C. § 371 of International Application No. PCT/CN2021/141912, filed Dec. 28, 2021, which claims the benefit of priority to Chinese Patent Application No. 202110047338.2, filed before CNIPA on Jan. 14, 2021, titled "METHOD FOR PURIFYING KEY INTERMEDIATES OF CITALOPRAM", each of which are incorporated herein in their entirety by reference.

FIELD OF THE INVENTION

The present invention relates to a method for purifying key intermediates of citalopram.

BACKGROUND OF THE INVENTION

4-[4-(Dimethylamino)-1-(4-fluorophenyl)-1-hydroxybutyl]-3-hydroxymethylbenzonitrile hydrochloride is a key intermediate in the synthesis of citalopram hydrobromide and S-citalopram oxalate, and has the following structural formula:

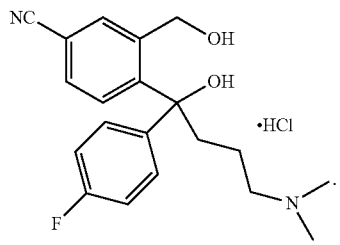 [SMILES: CN(C)CCCC(O)(c1ccc(F)cc1)c1ccc(C#N)cc1CO ; Cl]

The current preparation method of 4-[4-(dimethylamino)-1-(4-fluorophenyl)-1-hydroxybutyl]-3-hydroxymethylbenzonitrile hydrochloride mainly comprises: carrying out an addition reaction of 5-cyanophthalide and p-fluorophenyl magnesium bromide, then reacting the resultant with 3-dimethylaminopropyl magnesium chloride, and performing hydrolysis and salifying to obtain 4-[4-(dimethylamino)-1-(4-fluorophenyl)-1-hydroxybutyl]-3-hydroxymethylbenzonitrile hydrochloride. The synthetic route is shown below:

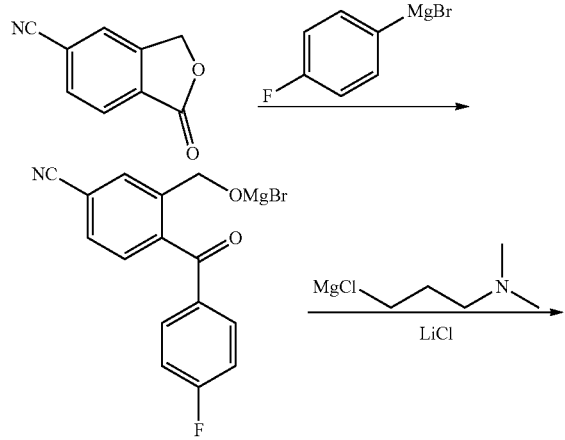

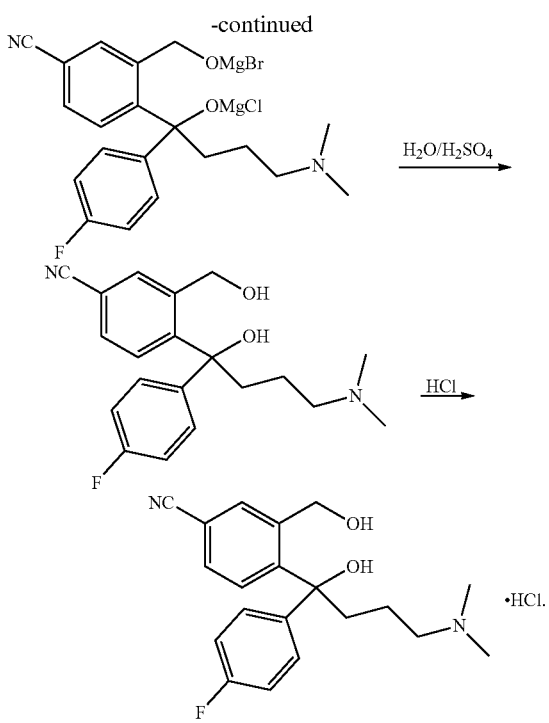

The synthetic route was found to be prone to produce an impurity named 4-[4-(dimethylamino)-1-(4-fluorophenyl)-1-hydroxybutyl]-3-hydroxymethylbenzaldehyde (formula I). The impurity is similar in nature to the product and is extremely difficult to remove, and has a content level of about 0.1% to about 0.4%.

Formula I

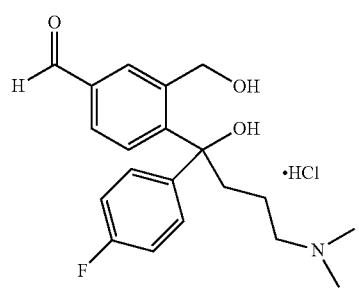

In view of the above problem regarding the impurity, it is necessary to develop a purification method for 4-[4-(dimethylamino)-1-(4-fluorophenyl)-1-hydroxybutyl]-3-hydroxymethylbenzonitrile or a hydrochloride thereof.

SUMMARY

In one aspect, the present invention provides a purification method for 4-[4-(dimethylamino)-1-(4-fluorophenyl)-1-hydroxybutyl]-3-hydroxymethylbenzonitrile.

The purification method for 4-[4-(dimethylamino)-1-(4-fluorophenyl)-1-hydroxybutyl]-3-hydroxymethylbenzonitrile comprises the steps of: dissolving a crude 4-[4-(dimethylamino)-1-(4-fluorophenyl)-1-hydroxybutyl]-3-hydroxymethylbenzonitrile (containing the impurity comprising formaldehyde group, i.e., compound of formula I) in an organic solvent to obtain an organic solution of dissolved 4-[4-(dimethylamino)-1-(4-fluorophenyl)-1-hydroxybutyl]-3-hydroxymethylbenzonitrile; adding an aqueous washing solution to the organic solution, and under a controlled temperature, stirring, standing and layering the mixed solution, and removing the aqueous layer to obtain a purified organic solution of 4-[4-(dimethylamino)-1-(4-fluorophenyl)-1-hydroxybutyl]-3-hydroxymethylbenzonitrile; and concentrating the purified organic solution to dryness to obtain a purified 4-[4-(dimethylamino)-1-(4-fluorophenyl)-1-hydroxybutyl]-3-hydroxymethylbenzonitrile.

In a preferred technical solution, the aqueous washing solution comprises dithionite, water, and optionally an inorganic base. Preferably, the dithionite is sodium dithionite.

Further, a weight to volume ratio of the sodium dithionite and water ranges from 0.01 g/mL to 0.3 g/mL, preferably is 0.05 g/mL.

Further, the inorganic base is selected from sodium hydroxide, potassium hydroxide, sodium bicarbonate, potassium bicarbonate, potassium carbonate, and sodium carbonate, or any combinations thereof; preferably the inorganic base is selected from sodium bicarbonate and potassium carbonate, or combination thereof.

Further, a weight ratio of the inorganic base and sodium dithionite ranges from 0 to 0.3, preferably is 0.1.

Preferably, the controlled temperature is 40° C. to 45° C.

Preferably, a volume to weight ratio of the aqueous washing solution and the crude 4-[4-(dimethylamino)-1-(4-fluorophenyl)-1-hydroxybutyl]-3-hydroxymethylbenzonitrile ranges from 1 mL/g to 5 mL/g, preferably is 2 mL/g.

Preferably, the organic solvent is a water-immiscible organic solvent selected from the group consisting of toluene, ethyl acetate, methyl isobutyl ketone and chlorobenzene.

Preferably, a volume to weight ratio of the organic solvent and crude 4-[4-(dimethylamino)-1-(4-fluorophenyl)-1-hydroxybutyl]-3-hydroxymethylbenzonitrile ranges from 2 mL/g to 10 mL/g.

Preferably, the organic solution of dissolved 4-[4-(dimethylamino)-1-(4-fluorophenyl)-1-hydroxybutyl]-3-hydroxymethylbenzonitrile can be obtained by dissolving a crude 4-[4-(dimethylamino)-1-(4-fluorophenyl)-1-hydroxybutyl]-3-hydroxymethylbenzonitrile hydrochloride, adding liquid caustic soda to adjust pH, stirring the mixture to dissolve, standing and layering the thus obtained solution, and removing the aqueous layer.

In another aspect, the present invention provides a purification method for 4-[4-(dimethylamino)-1-(4-fluorophenyl)-1-hydroxybutyl]-3-hydroxymethylbenzonitrile hydrochloride, comprising:

1) dissolving a crude 4-[4-(dimethylamino)-1-(4-fluorophenyl)-1-hydroxybutyl]-3-hydroxymethylbenzonitrile hydrochloride, adding liquid caustic soda to adjust pH, stirring the mixture to dissolve, standing and layering the thus obtained solution, and removing the aqueous layer to obtain an organic solution of dissolved 4-[4-(dimethylamino)-1-(4-fluorophenyl)-1-hydroxybutyl]-3-hydroxymethylbenzonitrile;

2) adding an aqueous washing solution to the organic solution of dissolved 4-[4-(dimethylamino)-1-(4-fluorophenyl)-1-hydroxybutyl]-3-hydroxymethylbenzonitrile obtained in step 1), and under a controlled temperature, stirring, standing and layering the mixed solution, and removing the aqueous layer to obtain a purified organic solution of 4-[4-(dimethylamino)-1-(4-fluorophenyl)-1-hydroxybutyl]-3-hydroxymethylbenzonitrile; and 3) adding a hydrochloric acid solution to the purified organic solution of 4-[4-(dimethylamino)-1-(4-fluorophenyl)-1-hydroxybutyl]-3-hydroxymethylbenzonitrile to adjust pH, and layering, filtering the mixture and adding with acetone, purifying the resultant by trituration, and drying the product to obtain a purified 4-[4-(dimethylamino)-1-(4-fluorophenyl)-1-hydroxybutyl]-3-hydroxymethylbenzonitrile hydrochloride.

Preferably, the crude 4-[4-(dimethylamino)-1-(4-fluorophenyl)-1-hydroxybutyl]-3-hydroxymethylbenzonitrile hydrochloride is dissolved by adding a mixture of an organic solvent and water, and the organic solvent is a water-immiscible organic solvent selected from the group consisting of toluene, ethyl acetate, methyl isobutyl ketone and chlorobenzene, and a volume ratio of the organic solvent and water ranges from 1:1 to 5:1.

Further, a volume to weight ratio of the organic solvent and 4-[4-(dimethylamino)-1-(4-fluorophenyl)-1-hydroxybutyl]-3-hydroxymethylbenzonitrile hydrochloride ranges from 2 mL/g to 10 mL/g.

The purification method of the present invention is also suitable for the purification of other salts of 4-[4-(dimethylamino)-1-(4-fluorophenyl)-1-hydroxybutyl]-3-hydroxymethylbenzonitrile, e.g., of 4-[4-(dimethylamino)-1-(4-fluorophenyl)-1-hydroxybutyl]-3-hydroxymethylbenzonitrile sulfate or 4-[4-(dimethylamino)-1-(4-fluorophenyl)-1-hydroxybutyl]-3-hydroxymethylbenzonitrile hydrobromide.

Both the crude 4-[4-(dimethylamino)-1-(4-fluorophenyl)-1-hydroxybutyl]-3-hydroxymethylbenzonitrile and the crude 4-[4-(dimethylamino)-1-(4-fluorophenyl)-1-hydroxybutyl]-3-hydroxymethylbenzonitrile salt described in the present invention contain impurity of formula I.

The present invention provides the purification method for 4-[4-(dimethylamino)-1-(4-fluorophenyl)-1-hydroxybutyl]-3-hydroxymethylbenzonitrile and a salt thereof, the purification method has the advantages of high removal rate of the impurity comprising formaldehyde group, simple operation, inexpensive raw materials, and mild conditions, and is suitable for large-scale industrial production.

DETAILED DESCRIPTION

In order to make the purpose, technical solutions, and advantages of the present invention more clearly understood, the present invention is further described with reference to the examples. Obviously, the described examples are only a part of the examples of the present invention, and are not all of them. All other examples obtained by a person of ordinary skills in the art based on the examples of the present invention fall within the protection scope of the present invention.

The raw materials used in the examples are commercially available. The following specific examples are only preferred examples of the present invention for further detailed description of the invention, and cannot be used to limit the scope of the present invention.

Example 1

In a beaker, 0.5 g of sodium dithionite, 50 mL of water and 0.05 g of sodium carbonate were added successively, and the mixture was stirred until dissolved and clarified to obtain an aqueous washing solution.

In a three-necked flask, 20 g of 4-[4-(dimethylamino)-1-(4-fluorophenyl)-1-hydroxybutyl]-3-hydroxymethylbenzonitrile (containing 0.163% impurity of formula I) and 100 mL of toluene were added successively. The mixture was heated to a temperature of 40° C. to 45° C. and was stirred until dissolved and clarified, and was added with the aqueous washing solution. The mixture was controlled at a temperature of 40° C. to 45° C., and was stirred for 30 min and allowed to stand and layer. The aqueous layer was removed, and the organic layer was concentrated to dryness under reduced pressure to obtain purified 4-[4-(dimethylamino)-1-(4-fluorophenyl)-1-hydroxybutyl]-3-hydroxymethylbenzonitrile. The purity was 99.93%; the yield was 95%; and the content of impurity of formula I was detected as 0.01%.

Example 2

In a beaker, 0.5 g of sodium dithionite and 50 mL of water were added successively, and the mixture was stirred until dissolved and clarified to obtain an aqueous washing solution.

In a three-necked flask, 20 g of 4-[4-(dimethylamino)-1-(4-fluorophenyl)-1-hydroxybutyl]-3-hydroxymethylbenzonitrile (containing 0.163% impurity of formula I) and 100 mL of toluene were added successively. The mixture was heated to a temperature of 40° C. to 45° C. and was stirred until dissolved and clarified, and was added with the washing solution. The mixture was controlled at a temperature of 40° C. to 45° C., and was stirred for 30 min and allowed to stand and layer. The aqueous layer was removed, and the organic layer was concentrated to dryness under reduced pressure to obtain purified 4-[4-(dimethylamino)-1-(4-fluorophenyl)-1-hydroxybutyl]-3-hydroxymethylbenzonitrile. The purity was 99.90%; the yield was 96%; and the content of impurity of formula I was detected as 0.022%.

Example 3

In a three-necked flask, 25 g of 4-[4-(dimethylamino)-1-(4-fluorophenyl)-1-hydroxybutyl]-3-hydroxymethylbenzonitrile hydrochloride, 200 mL of toluene and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand and layer. The aqueous layer was removed. The organic layer is a toluene solution of 4-[4-(dimethylamino)-1-(4-fluorophenyl)-1-hydroxybutyl]-3-hydroxymethylbenzonitrile, and the content of impurity of formula I was detected as 0.182%.

Example 4

In a beaker, 2.5 g of sodium dithionate and 50 mL of water were added successively, and the mixture was stirred until dissolved and clarified to obtain an aqueous washing solution.

The aqueous washing solution was added to the toluene solution of 4-[4-(dimethylamino)-1-(4-fluorophenyl)-1-hydroxybutyl]-3-hydroxymethylbenzonitrile prepared in Example 3. The mixture was controlled at a temperature of 40° C. to 45° C., and was stirred for 60 min and allowed to stand and layer. The aqueous layer was removed to obtain a purified toluene solution of 4-[4-(dimethylamino)-1-(4-fluorophenyl)-1-hydroxybutyl]-3-hydroxymethylbenzonitrile, and the content of impurity of formula I was detected as 0.02%.

Example 5

In a beaker, 2.5 g of sodium dithionate, 50 mL of water and 0.25 g of potassium carbonate were added successively, and the mixture was stirred until dissolved and clarified to obtain an aqueous washing solution.

The aqueous washing solution was added to the toluene solution of 4-[4-(dimethylamino)-1-(4-fluorophenyl)-1-hydroxybutyl]-3-hydroxymethylbenzonitrile prepared in Example 3. The mixture was controlled at a temperature of 40° C. to 45° C., and was stirred for 60 min and allowed to stand and layer. The aqueous layer was removed to obtain a purified toluene solution of 4-[4-(dimethylamino)-1-(4-fluorophenyl)-1-hydroxybutyl]-3-hydroxymethylbenzonitrile, and the content of impurity of formula I was detected as 0.04%.

Example 6

In a beaker, 15 g of sodium dithionate, 50 mL of water and 0.75 g of potassium carbonate were added successively, and the mixture was stirred until dissolved and clarified to obtain an aqueous washing solution.

The aqueous washing solution was added to the toluene solution of 4-[4-(dimethylamino)-1-(4-fluorophenyl)-1-hydroxybutyl]-3-hydroxymethylbenzonitrile prepared in Example 3. The mixture was controlled at a temperature of 40° C. to 45° C., and was stirred for 60 min and allowed to stand and layer. The aqueous layer was removed to obtain a purified toluene solution of 4-[4-(dimethylamino)-1-(4-fluorophenyl)-1-hydroxybutyl]-3-hydroxymethylbenzonitrile, and the content of impurity of formula I was detected as 0.014%.

Example 7

In a beaker, 2.5 g of sodium dithionate, 50 mL of water and 0.25 g of sodium bicarbonate were added successively, and the mixture was stirred until dissolved and clarified to obtain an aqueous washing solution.

The aqueous washing solution was added to the toluene solution of 4-[4-(dimethylamino)-1-(4-fluorophenyl)-1-hydroxybutyl]-3-hydroxymethylbenzonitrile prepared in Example 3. The mixture was controlled at a temperature of 40° C. to 45° C., and was stirred for 60 min and allowed to stand and layer. The aqueous layer was removed to obtain a purified toluene solution of 4-[4-(dimethylamino)-1-(4-fluorophenyl)-1-hydroxybutyl]-3-hydroxymethylbenzonitrile, and the content of impurity of formula I was detected as 0.022%.

Example 8

In a beaker, 2.5 g of sodium dithionite, 50 mL of water and 0.25 g of sodium bicarbonate were added successively, and the mixture was stirred until dissolved and clarified to obtain an aqueous washing solution.

In a three-necked flask, 25 g of 4-[4-(dimethylamino)-1-(4-fluorophenyl)-1-hydroxybutyl]-3-hydroxymethylbenzonitrile hydrochloride (containing 0.187% impurity of formula I), 200 mL of toluene and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous layer was cooled to 0° C. to 5° C., centrifuged, and filtered. 24 mL of acetone was added to the filter cake, and the resultant was purified by trituration and dried to obtain 4-[4-(dimethylamino)-1-(4-fluorophenyl)-1-hydroxybutyl]-3-hydroxymethylbenzonitrile hydrochloride. Yield: 90%; purity: 99.95%; impurity of formula I: 0.017%; impurity removal rate: 90.9%.

Example 9

In a beaker, 0.5 g of sodium dithionite, 50 mL of water and 0.15 g of sodium carbonate were added successively, and the mixture was stirred until dissolved and clarified to obtain an aqueous washing solution.

In a three-necked flask, 25 g of 4-[4-(dimethylamino)-1-(4-fluorophenyl)-1-hydroxybutyl]-3-hydroxymethylbenzonitrile hydrochloride (containing 0.210% impurity of formula I), 200 mL of methyl isobutyl ketone and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand. The aqueous layer was removed, and the organic layer obtained by separation was added with the as prepared aqueous washing solution. The mixture was controlled at a temperature of 40° C. to 45° C., and was stirred for 60 min and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous solution was cooled to 0° C. to 5° C., centrifuged, and filtered. 24 mL of acetone was added to the filter cake. The resultant was purified by trituration and dried to obtain 4-[4-(dimethylamino)-1-(4-fluorophenyl)-1-hydroxybutyl]-3-hydroxymethylbenzonitrile hydrochloride. Yield: 92%; purity: 99.91%; impurity of formula I: 0.018%; impurity removal rate: 91.4%.

Example 10

In a beaker, 15 g of sodium dithionate, 50 mL of water and 0.75 g of potassium carbonate were added successively, and the mixture was stirred until dissolved and clarified to obtain an aqueous washing solution.

In a three-necked flask, 25 g of 4-[4-(dimethylamino)-1-(4-fluorophenyl)-1-hydroxybutyl]-3-hydroxymethylbenzonitrile hydrochloride (containing 0.210% impurity of formula I), 200 mL of ethyl acetate and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand. The aqueous layer was removed, and the organic layer was added with the as prepared aqueous washing solution. The mixture was controlled at a temperature of 40° C. to 45° C., and was stirred for 60 min and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous solution was cooled to 0° C. to 5° C., centrifuged and filtered. 24 mL of acetone was added to the filter cake, and the resultant was purified by trituration and dried to obtain 4-[4-(dimethylamino)-1-(4-fluorophenyl)-1-hydroxybutyl]-3-hydroxymethylbenzonitrile hydrochloride. Yield: 89%; purity: 99.90%; impurity of formula I: 0.025%; impurity removal rate: 88.1%.

Example 11

In a beaker, 0.5 g of sodium sulfite, 50 mL of water and 0.05 g of sodium hydroxide were added successively, and the mixture was stirred until dissolved and clarified to obtain an aqueous washing solution.

In a three-necked flask, 25 g of 4-[4-(dimethylamino)-1-(4-fluorophenyl)-1-hydroxybutyl]-3-hydroxymethylbenzonitrile hydrochloride (containing 0.210% impurity of formula I), 200 mL of toluene and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand. The aqueous layer was removed, and the organic layer obtained by separation was added with the aqueous washing solution. The mixture was controlled at a temperature of 50° C. to 60° C., and was stirred for 120 min and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous solution was cooled to 0° C. to 5° C., centrifuged, and filtered. 24 mL of acetone was added to the filter cake, and the resultant was purified by trituration and dried to obtain 4-[4-(dimethylamino)-1-(4-fluorophenyl)-1-hydroxybutyl]-3-hydroxymethylbenzonitrile hydrochloride. Yield: 90%; purity: 99.92%; impurity of formula I: 0.021%; impurity removal rate: 90%.

Example 12

In a beaker, 0.05 g of sodium thiosulfate, 50 mL of water and 0.02 g of potassium hydroxide were added successively, and the mixture was stirred until dissolved and clarified to obtain an aqueous washing solution.

In a three-necked flask, 25 g of 4-[4-(dimethylamino)-1-(4-fluorophenyl)-1-hydroxybutyl]-3-hydroxymethylbenzonitrile hydrochloride (containing 0.210% impurity of formula I), 200 mL of methyl isobutyl ketone and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand and layer. The aqueous layer was removed, and the organic layer obtained by separation was added with the washing solution. The mixture was controlled at a temperature of 40° C. to 45° C., and was stirred for 60 min and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous solution was cooled to 0° C. to 5° C., centrifuged, and filtered. 24 mL of acetone was added to the filter cake, and the resultant was purified by trituration and dried to obtain 4-[4-(dimethylamino)-1-(4-fluorophenyl)-1-hydroxybutyl]-3-hydroxymethylbenzonitrile hydrochloride. Yield: 92%; purity: 99.91%; impurity of formula I: 0.030%; impurity removal rate: 85.7%.

Example 13

In a beaker, 0.5 g of sodium sulfite, 50 mL of water and 0.05 g of potassium bicarbonate were added successively, and the mixture was stirred until dissolved and clarified to obtain an aqueous washing solution. In a three-necked flask, 25 g of 4-[4-(dimethylamino)-1-(4-fluorophenyl)-1-hydroxybutyl]-3-hydroxymethylbenzonitrile hydrochloride (containing 0.210% impurity of formula I), 200 mL of methyl isobutyl ketone and 100 mL of water were added successively. The temperature was raised to 45° C. Ion-exchange membrane liquid caustic soda was slowly added dropwise to adjust pH of the aqueous solution to 12. The mixture was stirred until dissolved and clarified, and allowed to stand and layer. The aqueous layer was removed, and the organic layer obtained by separation was added with the aqueous washing solution. The mixture was controlled at a temperature of 40° C. to 45° C., and was stirred for 60 min and allowed to stand and layer. The aqueous layer was removed to obtain the organic layer. Then 30 mL of water was added to the organic layer, and concentrated hydrochloric acid was added dropwise to adjust pH of the aqueous layer to 4 to 5. The mixture was layered, and the aqueous solution was cooled to 0° C. to 5° C., centrifuged, and filtered. 24 mL of acetone was added to the filter cake, and the resultant was purified by trituration and dried to obtain 4-[4-(dimethylamino)-1-(4-fluorophenyl)-1-hydroxybutyl]-3-hydroxymethylbenzonitrile hydrochloride. Yield: 90%; purity: 99.89%; impurity of formula I: 0.022%; impurity removal rate: 89.5%.

The above mentioned examples are only preferred examples of the present invention, and are not used to limit the invention. Any modification, equivalent replacement, improvement, etc. made within the spirit and principles of the invention, shall be included within the protection scope of the invention.

The invention claimed is:

1. A purification method for 4-[4-(dimethylamino)-1-(4-fluorophenyl)-1-hydroxybutyl]-3-hydroxymethylbenzonitrile, comprising the steps of:
    dissolving a crude 4-[4-(dimethylamino)-1-(4-fluorophenyl)-1-hydroxybutyl]-3-hydroxymethylbenzonitrile in an organic solvent to obtain an organic solution of dissolved 4-[4-(dimethylamino)-1-(4-fluorophenyl)-1-hydroxybutyl]-3-hydroxymethylbenzonitrile;
    adding an aqueous washing solution to the organic solution, and under a controlled temperature, stirring, standing and layering the mixed solution, and removing the aqueous layer to obtain a purified organic solution of 4-[4-(dimethylamino)-1-(4-fluorophenyl)-1-hydroxybutyl]-3-hydroxymethylbenzonitrile; and
    concentrating the purified organic solution to dryness to obtain a purified 4-[4-(dimethylamino)-1-(4-fluorophenyl)-1-hydroxybutyl]-3-hydroxymethylbenzonitrile.

2. The purification method according to claim 1, wherein the aqueous washing solution comprises dithionite, water, and optionally an inorganic base.

3. The purification method according to claim 2, wherein a weight to volume ratio of the dithionite and water ranges from 0.01 g/mL to 0.3 g/mL.

4. The purification method according to claim 2, wherein the inorganic base is selected from sodium hydroxide, potassium hydroxide, sodium bicarbonate, potassium bicarbonate, potassium carbonate, and sodium carbonate, or any combinations thereof.

5. The purification method according to claim 2, wherein a weight ratio of the inorganic base and dithionite ranges from 0 to 0.3.

6. The purification method according to claim 1, wherein the controlled temperature is 40° C. to 45° C.

7. The purification method according to claim 1, wherein a volume to weight ratio of the aqueous washing solution and the crude 4-[4-(dimethylamino)-1-(4-fluorophenyl)-1-hydroxybutyl]-3-hydroxymethylbenzonitrile ranges from 1 mL/g to 5 mL/g.

8. The purification method according to claim 1, wherein the organic solvent is a water-immiscible organic solvent selected from the group consisting of toluene, ethyl acetate, methyl isobutyl ketone and chlorobenzene.

9. The purification method according to claim 1, wherein a volume to weight ratio of the organic solvent and the crude 4-[4-(dimethylamino)-1-(4-fluorophenyl)-1-hydroxybutyl]-3-hydroxymethylbenzonitrile ranges from 2 mL/g to 10 mL/g.

10. The purification method according to claim 1, wherein the organic solution of dissolved 4-[4-(dimethylamino)-1-(4-fluorophenyl)-1-hydroxybutyl]-3-hydroxymethylbenzonitrile can be obtained by dissolving a crude 4-[4-(dimethylamino)-1-(4-fluorophenyl)-1-hydroxybutyl]-3-hydroxymethylbenzonitrile hydrochloride, liquid caustic soda to adjust pH, stirring the mixture to dissolve, standing and layering the thus obtained solution, and removing the aqueous layer.

11. A purification method for 4-[4-(dimethylamino)-1-(4-fluorophenyl)-1-hydroxybutyl]-3-hydroxymethylbenzonitrile hydrochloride, comprising:
    1) dissolving a crude 4-[4-(dimethylamino)-1-(4-fluorophenyl)-1-hydroxybutyl]-3-hydroxymethylbenzonitrile hydrochloride, adding liquid caustic soda to adjust pH, stirring the mixture to dissolve, standing and layering the thus obtained solution, and removing the aqueous layer to obtain an organic solution of dissolved 4-[4-(dimethylamino)-1-(4-fluorophenyl)-1-hydroxybutyl]-3-hydroxymethylbenzonitrile;
    2) adding an aqueous washing solution to the organic solution of dissolved 4-[4-(dimethylamino)-1-(4-fluorophenyl)-1-hydroxybutyl]-3-hydroxymethylbenzonitrile in step 1), and under a controlled temperature, stirring, standing and layering the mixed solution, and removing the aqueous layer to obtain a purified organic solution of 4-[4-(dimethylamino)-1-(4-fluorophenyl)-1-hydroxybutyl]-3-hydroxymethylbenzonitrile; and
    3) adding a hydrochloric acid solution to the purified organic solution of 4-[4-(dimethylamino)-1-(4-fluorophenyl)-1-hydroxybutyl]-3-hydroxymethylbenzonitrile to adjust pH, and layering, filtering the mixture and adding with acetone, purifying the resultant by trituration, and drying the product to obtain a purified 4-[4-(dimethylamino)-1-(4-fluorophenyl)-1-hydroxybutyl]-3-hydroxymethylbenzonitrile hydrochloride.

12. The purification method according to claim 11, wherein the crude 4-[4-(dimethylamino)-1-(4-fluorophenyl)-1-hydroxybutyl]-3-hydroxymethylbenzonitrile hydrochloride is dissolved by adding a mixture of an organic solvent and water, and the organic solvent is a water-immiscible organic solvent selected from the group consisting of toluene, ethyl acetate, methyl isobutyl ketone and chlorobenzene, and a volume ratio of the organic solvent and water ranges from 1:1 to 5:1.

13. The purification method according to claim 11, wherein a volume to weight ratio of the organic solvent and 4-[4-(dimethylamino)-1-(4-fluorophenyl)-1-hydroxybutyl]-3-hydroxymethylbenzonitrile hydrochloride ranges from 2 mL/g to 10 mL/g.

14. Use of the purification method according to claim 1 in the purification of a salt of 4-[4-(dimethylamino)-1-(4-fluorophenyl)-1-hydroxybutyl]-3-hydroxymethylbenzonitrile.

15. The purification method according to claim 2, wherein the dithionite is sodium dithionite.

16. The purification method according to claim 2, wherein a weight to volume ratio of the dithionite and water is 0.05 g/mL.

17. The purification method according to claim 2, wherein the inorganic base is selected from sodium bicarbonate and potassium carbonate, or combination thereof.

18. The purification method according to claim 2, wherein a weight ratio of the inorganic base and dithionite is 0.1.

19. The purification method according to claim 1, wherein a volume to weight ratio of the aqueous washing solution and the crude 4-[4-(dimethylamino)-1-(4-fluorophenyl)-1-hydroxybutyl]-3-hydroxymethylbenzonitrile is 2 mL/g.

* * * * *